(12) United States Patent
Fan et al.

(10) Patent No.: US 9,983,438 B2
(45) Date of Patent: May 29, 2018

(54) DISPLAY DEVICE

(71) Applicant: INNOLUX CORPORATION, Miao-Li County (TW)

(72) Inventors: Kuo-Jung Fan, Miao-Li County (TW); Li-Wei Mao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days. days.

(21) Appl. No.: 14/918,979

(22) Filed: Oct. 21, 2015

(65) Prior Publication Data
US 2016/0116801 A1   Apr. 28, 2016

(30) Foreign Application Priority Data
Oct. 23, 2014  (TW) .............................. 103136602 A

(51) Int. Cl.
*G02F 1/1335* (2006.01)
*F21V 8/00* (2006.01)

(52) U.S. Cl.
CPC ........ *G02F 1/133617* (2013.01); *G02B 6/005* (2013.01); *G02F 1/133514* (2013.01); *G02F 2001/133614* (2013.01); *G02F 2202/36* (2013.01)

(58) Field of Classification Search
CPC ........... G02F 1/133617; G02F 2202/36; G02F 1/133514; G02F 2001/133614; G02F 1/133512; G02B 6/005
See application file for complete search history.

(56) References Cited

U.S. PATENT DOCUMENTS

| 8,947,619 B2 | 2/2015 | Li et al. |
| 9,239,458 B2 * | 1/2016 | Yoon ...................... G02B 26/02 |
| 2013/0070188 A1 * | 3/2013 | Ishikawa ........... G02F 1/133512 349/110 |

(Continued)

FOREIGN PATENT DOCUMENTS

| CN | 104090408 A | 10/2014 |
| TW | 201341899 A | 10/2013 |

OTHER PUBLICATIONS

Taiwan Patent Office, Office action dated Oct. 14, 2015.

*Primary Examiner* — Michael Caley
*Assistant Examiner* — Mariam Qureshi
(74) *Attorney, Agent, or Firm* — Li & Cai Intellectual Property (USA) Office

(57) ABSTRACT

A display panel includes a first substrate, a second substrate, a display medium layer, a color filter layer, a third substrate, a backlight module, and a quantum dot pattern layer. The display medium layer and the color filter layer are disposed between the first and second substrates. The color filter layer includes a first color filter pattern. The backlight module is disposed on one side of the second substrate. The second and the third substrate are disposed between the backlight module and the display medium layer, and between the backlight module and the second substrate, respectively. The quantum dot pattern layer is disposed on the third substrate and between the third substrate and the second substrate, and includes at least one first quantum dot pattern corresponding to first color filter pattern. The first quantum dot pattern's color is equal to the first color filter pattern's color.

9 Claims, 9 Drawing Sheets

(56) References Cited

U.S. PATENT DOCUMENTS

| | | | |
|---|---|---|---|
| 2014/0168576 A1* | 6/2014 | Lee | H01J 29/90 349/71 |
| 2015/0048348 A1* | 2/2015 | Huang | H01L 27/322 257/40 |
| 2015/0062490 A1* | 3/2015 | Kwon | G02F 1/133621 349/64 |
| 2015/0109560 A1* | 4/2015 | Guo | G02F 1/133617 349/68 |
| 2015/0198834 A1* | 7/2015 | Wu | G02F 1/133514 349/61 |
| 2015/0219289 A1* | 8/2015 | Seo | G02F 1/353 362/608 |
| 2015/0228232 A1* | 8/2015 | Lee | G09G 3/3607 345/88 |
| 2015/0228323 A1* | 8/2015 | Manipatruni | H03K 19/16 365/158 |
| 2016/0077273 A1* | 3/2016 | Kim | G02B 6/0051 362/633 |
| 2016/0357068 A1* | 12/2016 | Yang | H01L 27/32 |

* cited by examiner

DISPLAY DEVICE

BACKGROUND

1. Field of the Invention

The instant disclosure relates to a display device, in particular, relates to a display device having a quantum dot pattern layer.

2. Description of Related Art

In general, the liquid crystal display includes an active element array substrate, color filter, polarizer films and backlight module. The active element array substrate is formed by disposing thin film transistors that control voltage of sub-pixels, so as to adjust the angle of the deflection of liquid crystal. Then, the gray scale data of sub-pixels can be adjusted. Through the color filter and the grey scale data of sub-pixels, the sub-pixels emitting red, blue and green light can produce an image.

At present, most backlights of liquid crystal displays are blue light emitting diode chips with yellow phosphor (such as YAG or TAG) or blue light emitting diode chips accompanied with green phosphor and red phosphor.

However, the peak of excitation spectrum of the color phosphors is relatively wide when using blue light emitting diode to excite the color phosphors. Therefore, it is relatively hard to achieve pure color and wide color gamut in the display frame of the liquid crystal display.

SUMMARY OF THE INVENTION

An embodiment of the instant disclosure provides a display device which can achieve pure color and wide color gamut.

An embodiment of the instant disclosure provides a display device which includes a first substrate, a second substrate, a display medium layer, a color filter layer, a third substrate, a quantum dot pattern layer, and a backlight module. The display medium layer is located between the first substrate and the second substrate. The color filter layer is located between the first substrate and the second substrate and includes a first color filter pattern. The backlight module is disposed at one side of the second substrate which is located between the backlight module and the display medium layer. The third substrate is located between the backlight module and the second substrate. The quantum dot pattern layer is disposed on the third substrate and between the third substrate and the second substrate, wherein the quantum dot pattern layer includes at least one first quantum dot pattern corresponding to the first color filter pattern, and the color of the first quantum dot pattern is identical to the color of the first color filter pattern.

In summary, those embodiments provide a display device including the quantum dot pattern layer deposed on the third substrate. The quantum dot pattern layer aligns with the color filter layer, and the color of the quantum dot pattern is identical to the corresponding filter pattern. In one embodiment, the quantum dot pattern layer consists of the configuration of the red quantum dot pattern and the transparent pattern. The location of the red quantum dot pattern corresponds to the location of the red filter pattern, and the locations of the transparent pattern correspond to the locations of the green and blue filter pattern. In this embodiment, the backlight module can accompany the blue light emitting diode chips and the green light emitting diode chips. In another embodiment, the quantum pattern layer consists of the configuration of the red quantum dot pattern, green quantum dot pattern and the transparent pattern. The locations of the red quantum dot pattern correspond to the locations of the red filter pattern, and the locations of the green quantum dot patterns correspond to the locations of the green filter patterns, and the locations of the transparent pattern correspond to the locations of the blue filter patterns. In this embodiment, the backlight module can accompany the blue light emitting diode chips. Since the peak of the excitation spectrum of the quantum dot pattern is narrow, it is feasible to excite the high purity light with different color through irradiating the backlight so as to raise the color saturation of the liquid crystal display device.

In addition, those embodiments can decrease the chance of leaking light through adjusting the width of the first light-shielding pattern. In another embodiment, the main peak value of the spectrum of the quantum dot pattern removes away from the main peak value of the transmission spectrum of the filter pattern and shifts toward the long wavelength by adjusting the size or materials of the quantum dot pattern or the filter pattern, so that the proportion of leakage light leaking to the adjacent filter pattern is smaller than about 10% of the total light to avoid affecting the purity of color.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

DETAILED DESCRIPTION OF THE PREFERRED EMBODIMENTS

Figure 1:
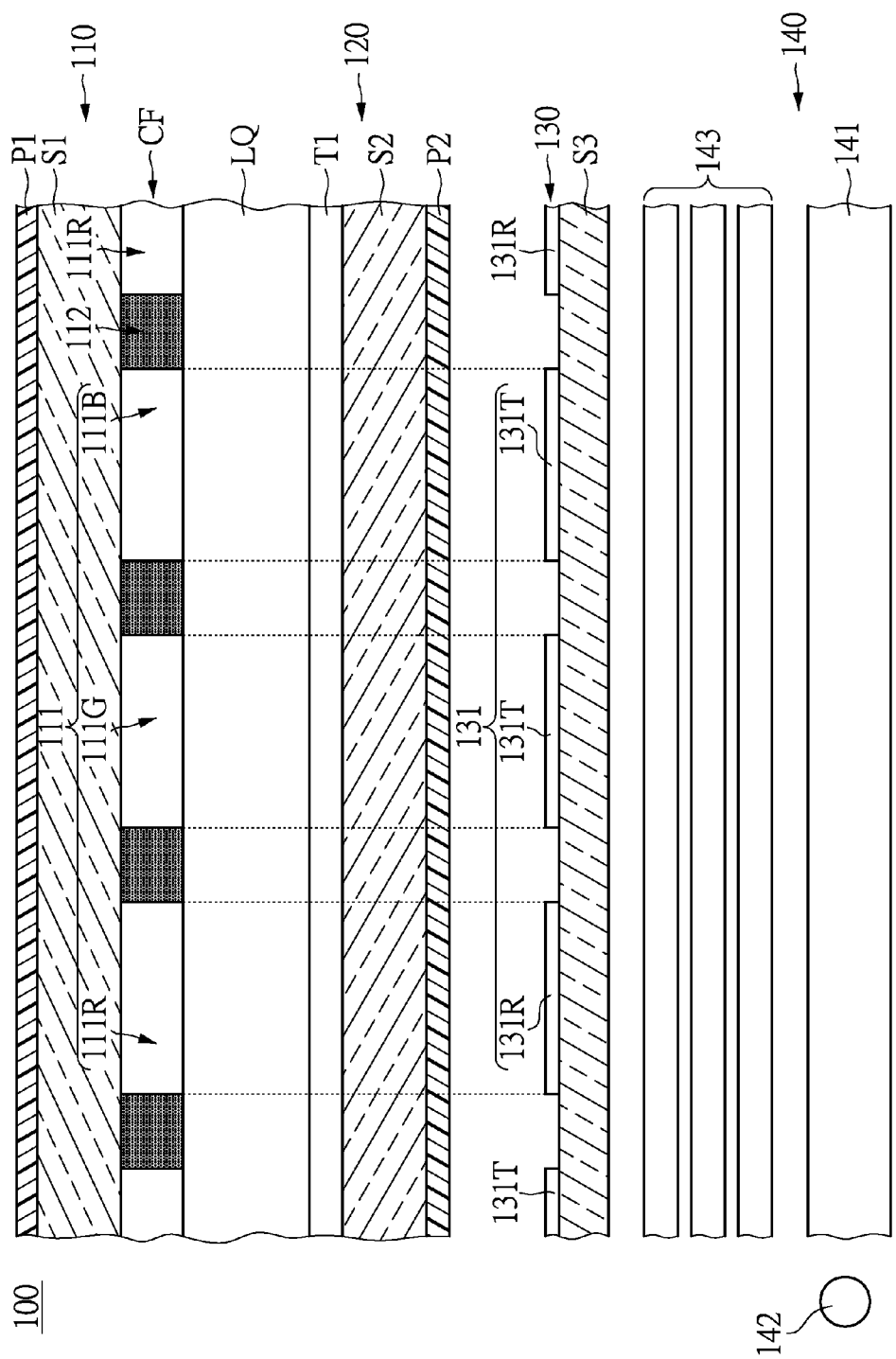
FIG. 1 illustrates a schematic structural view of a display device in accordance with the first embodiment of the instant disclosure.

The accompanying drawings show some exemplary embodiments, and a more detailed description of various embodiments with reference to the accompanying drawings in accordance with the present disclosure is set forth below. The concept of the invention may be embodied in many different forms and should not be construed as limited to the embodiment set forth herein. The exemplary embodiments set forth herein are provided so a person of ordinary skill in the art would thoroughly and completely understand the contents disclosed herein and to fully provide the spirit of the invention. In each of the drawings, the relative size, proportions, and depiction of the layers and regions in the drawings may be exaggerated for clarity and precision, and in which like numerals indicate like elements.

FIG. 1 illustrates a schematic structural view of a display device in accordance with the first embodiment of the instant disclosure. Please refer to FIG. 1. In the present embodiment, the display device 100 is a liquid crystal panel and includes a first substrate S1, a second substrate S2, a display medium layer LQ, a color filter layer CF, a quantum dot pattern layer 130, and a backlight module 140. The display medium layer LQ is located between the first substrate S1 and the second substrate S2, and the quantum dot pattern layer 130 is located between the first substrate S1 and the backlight module 140. In the first embodiment, the display device 100 further includes an upper polarizer P1 and a low polarizer P2. The upper polarizer P1 is disposed on the upper surface of the first substrate S1, whereas the low polarizer P2 is disposed on the lower surface of the second substrate S2.

The color filter layer CF includes a plurality of filter patterns 111 with various colors and at least one first light-shielding pattern 112. The filter patterns 111 and the first light-shielding pattern 112 may be disposed on the first substrate S1 to form a color filter substrate 110. However, in another embodiment, the color filter layer CF can be disposed on the second substrate S2. Therefore, the present disclosure does not limit the configuration of the color filter layer CF. The material of the first substrate S1 may be glass or quartz, or the first substrate S1 may be a flexible substrate (such as flexible plastic substrate). The first light-shielding pattern 112 can be partitioned into a plurality of pixel regions (not shown), where the filter patterns 111 are disposed in these pixel regions. The first light-shielding pattern 112 is used to shield the region out of pixel aperture to reduce pixel color mixing between adjacent filter patterns 111. The materials of the first light-shielding pattern 112 may be black resin and black photoresist material, and so on. The filter patterns 111 may be made of photoresist material with various colors, such as red filter patterns 111R, green filter patterns 111G, blue filter patterns 111B, and so on. The configuration of filter patterns 111 may be mosaic type, delta type, and stripe type. The instant disclosure does not limit the color, materials, and configuration of the filter patterns 111.

The active element array layer T1 is disposed between the first substrate S1 and the second substrate S2 to form an active element array substrate 120. The active element array layer T1 may include a plurality of thin film transistors (not shown), a plurality of data lines (not shown) and a plurality of scan lines (not shown) to control the pixel electrode to drive the liquid crystal to rotate so that the display device can show an image.

The display medium layer LQ is located between the first substrate S1 and the second substrate S2. In an embodiment, the display medium layer LQ is located between the color filter substrate 110 and the active element array substrate 120. The backlight module 140 is disposed on one side of the second substrate S2, and the second substrate S2 is located between the backlight module 140 and the display medium layer LQ. The display medium layer LQ is used to change the direction of polarization of incident light from the backlight module 140 to change the grayscale value of the pixels and then accompanies the color filter layer CF to show the color display. The display medium layer LQ can be made of various types of materials, such as nematic liquid crystals, smectic liquid crystals, cholesteric liquid crystals, and so on. The liquid crystal alignment types include vertical alignment LCD, homogeneous alignment LCD or twisted nematic LCD. While the display medium layer LQ alignment type is vertical alignment LCD or twisted nematic LCD, an opposite electrode may be disposed on the first substrate S1. However, the present disclosure does not limit the configuration of the opposite electrode.

In another embodiment, the display device may be a touch display device. In practice, a touch sensing layer (not shown) can be disposed on the first substrate S1. The touch sensing layer may be disposed between the upper polarizer P1 and the first substrate S1. For example, if the touch sensing layer is disposed on the upper polarizer P1, it is necessary to dispose a protective layer on the touch sensing layer to protect it. The protective layer may be a glass substrate or a paste layer.

The quantum dot pattern layer 130 is located between the second substrate S2 and the backlight module 140. In practice, the display device 100 further includes a third substrate S3 located between the backlight module 140 and the second substrate S2. The quantum dot pattern layer 130 is disposed on the third substrate S3, where the third substrate S3 is connected with the second substrate S2 through an adhesive layer (not shown). The third substrate S3 may be a glass substrate, a flexible substrate or a plastic substrate. In another embodiment, the third substrate S3 can be an optical film, such as light guide plate, or diffusion film.

The quantum dot pattern layer 130 includes at least one quantum dot pattern 131 corresponding to one of the filter patterns 111, and the color of the quantum dot pattern 131 is identical to the color of the filter pattern 111. Specifically, the color of the quantum dot pattern 131 can be red, green or a transparent color depending on the process procedure. The color of the quantum dot pattern 131 is described as identical to the color of the filter pattern 111, and the identical description is interpreted as when the difference between the peak values of the quantum dot pattern 131 and the filter pattern 111 in the transmission spectra is equal to or less than 50 nanometers. However, if the filter pattern 111 is a red filter pattern 111, the peak values of the red filter pattern 111R closest to the peak values of green filter pattern 111G are referred to.

In this embodiment, the quantum dot pattern 131 includes a first quantum dot pattern and a second quantum dot pattern, where the color of first quantum dot pattern is different from the second quantum dot pattern. For example, the color of the first quantum dot pattern is red, and the color of the second quantum dot pattern is transparent. Namely, the quantum dot pattern layer 130 consists of the configuration of the red quantum dot pattern 131R and the transparent quantum dot pattern 131T. The locations of the red quantum dot pattern 131R correspond to the location of the red filter pattern 111R, the locations of the transparent quantum dot patterns 131T correspond to the locations of the green filter patterns 111G and the blue filter patterns 111G. The relationship between the quantum dot patterns 131 with various colors and the filter patterns 111 with various colors are partial color alignment. That is, the quantum dot pattern 131 overlaps the filter patterns 111 partly. In one preferable embodiment, the quantum dot pattern 131 overlaps the filter patterns 111 fully. The quantum dot pattern 131 may include a third quantum dot pattern depending on a different design of the display device, and the color of the third quantum dot pattern is different from the color of the first and second quantum dot pattern.

The quantum dot patterns 131 with various colors may be made of polymer compound or photoresist material doped with quantum-dot material. The quantum-dot material is a nanometer semiconductor particle, such as cadmium selenide (CdSe), cadmium sulfide (CdS) or zinc sulfide (ZnS). Due to the influence of quantum confinement effect, the energy levels of the valence band and the conduction band of the quantum dot material exhibit discontinuity. The quantum dot patterns 131 can emit different wavelengths of light by adjusting the particle size of the quantum dot material so that the quantum dot patterns 131 can emit red light, blue light, or green light. In addition, the transparent quantum dot patterns 131T may be made of polymer compound or photoresist material. The quantum dot pattern in 131 or the transparent quantum dot patterns 131T can also add another scattering particle (such as zinc oxide ZnO) to adjust the brightness.

In other embodiment, the quantum dot pattern layer 130 can merely consist of the configuration of the red quantum dot patterns 131R without the configuration of the transparent quantum dot pattern 131T. The locations of the red quantum dot patterns 131R correspond to the red filter pattern 111R. Namely, the red quantum dot patterns 131R partially overlap the red filter pattern 111R in a plan view. In a preferable embodiment, the red quantum dot patterns 131R fully overlap the red filter pattern 111R, and the original locations of the transparent quantum dot pattern 131T corresponding to the locations of the green and blue filter pattern 111G, 111B are replaced with vacant sites.

The backlight module 140 includes a light guide plate 141, a light source 142 and an optical film 143. In this embodiment, the light source 142 includes a blue light-emitting diode providing blue light source and green light-emitting diode providing green light source. The energy of the blue light source and green light source excites the quantum dot pattern layer 130 so that the quantum dot pattern layer 130 can emit light with corresponding color.

Specifically, when the blue light-emitting diode irradiates upon the red quantum dot patterns 131R, part of the blue light provided by the blue light-emitting diode excites the red quantum dot patterns 131R to produce red light, and the remnant blue light provided by blue light-emitting diode penetrates through the red quantum dot patterns 131R.

Figure 2:
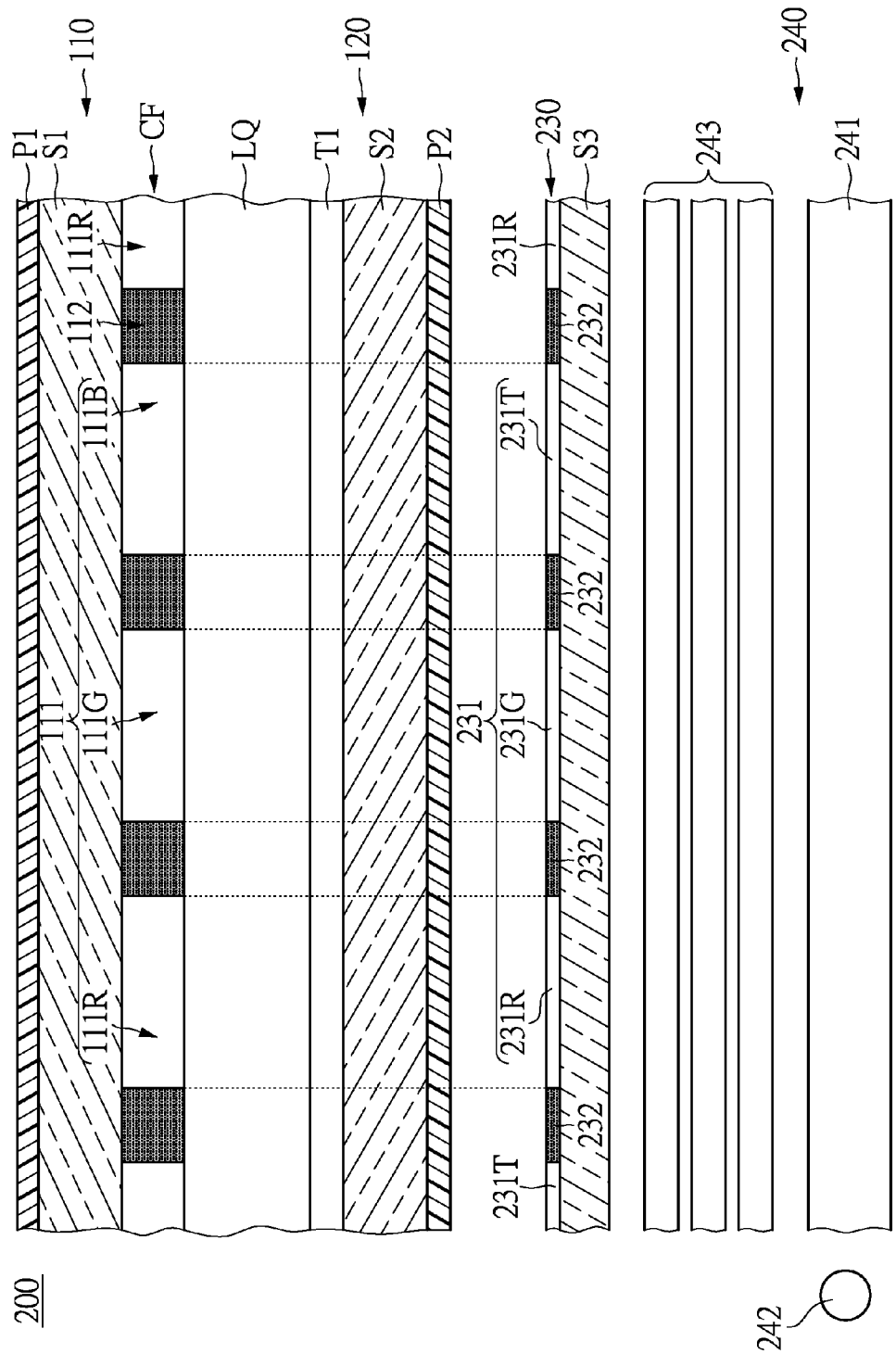
FIG. 2 illustrates a schematic structural view of a display device in accordance with the second embodiment of the instant disclosure.

FIG. 2 is a schematic structural view of a display device in accordance with the second embodiment of the instant disclosure. On the basis of the above mentioned display device, there is provided another quantum dot pattern layer 230 and backlight module 240. Most of the implementation details refer to the foregoing description, and the common features are not described again.

Please refer to FIG. 2, the quantum dot pattern layer 230 is located between the second substrate S2 and the backlight module 240. In practice, the display device further includes a third substrate S3 disposed between the second substrate S2 and the backlight module 240. The quantum dot pattern layer 230 is disposed on the third substrate S3. The quantum dot pattern layer 230 includes at least one quantum dot pattern 231 corresponding to one of the filter patterns 111, and the color of the quantum dot pattern 231 is identical to the color of the filter pattern 111. In this embodiment, the quantum dot pattern layer 230 consists of the configuration of the red quantum dot pattern 231R, the green quantum dot pattern 231G, and the transparent quantum dot pattern 231T. The locations of the red quantum dot pattern 231R correspond to the locations of the red filter patterns 111R, the locations of the green quantum dot patterns 231G correspond to the locations of the green filter patterns 111G and the blue filter patterns 111G, and the locations of the transparent quantum dot patterns 231T correspond to the locations of the blue filter patterns 111B.

In order to reduce color mixing between adjacent quantum dot patterns 231, the quantum dot pattern layer 230 further includes the second light-shielding pattern 232. The locations of the second light-shielding pattern 232 correspond to the locations of the first light-shielding pattern 112. The material of the second light-shielding pattern 232 may be as same as the material of the first light-shielding pattern 112, such as black resin and black photoresist material, and other light-shielding or light-reflecting material. The second light-shielding pattern 232 may be set depending on different design of the display device, where the quantum dot pattern layer 230 may not include the second light-shielding pattern 232. Therefore, the present disclosure does not limit the second light-shielding pattern 232.

In another embodiment, the quantum dot pattern layer 230 can merely consist of the configuration of the red quantum dot patterns 231R and the green quantum dot patterns 231G without the configuration of the transparent quantum dot pattern. The locations of the red quantum dot patterns 231R correspond to the red filter pattern 111R. The locations of the green quantum dot patterns 231G correspond to the green filter pattern 111G, and the original locations of the transparent quantum dot pattern 231T corresponding to the locations of the blue filter pattern 111B are replaced with vacant sites. Other transparent material may be disposed on the original locations of the transparent quantum dot pattern 231T, and the other transparent material can also add another scattering particle.

The backlight module 240 includes a light guide plate 241, a light source 242 and an optical film 243. In this embodiment, the light source 242 includes blue light-emitting diode providing blue light source. The energy of the blue light source can excite the quantum dot pattern layer 230 so that the quantum dot pattern layer 230 can emit light with corresponding color. In another embodiment, the light source 242 may include an ultraviolet source.

In practice, when the blue light-emitting diode irradiates upon the red quantum dot patterns 231R, part of blue light provided by the blue light-emitting diode excites the red quantum dot patterns 231R to produce red light, and the remnant blue light provided by the blue light-emitting diode penetrates through the red quantum dot patterns 231R. When the blue light-emitting diode irradiates upon the green quantum dot patterns 231G, part of the blue light provided by the blue light-emitting diode excites the green quantum dot patterns 231G to produce red light, and the remnant blue light provided by the blue light-emitting diode penetrates through the green quantum dot patterns 231G. When the blue light-emitting diode irradiates upon the transparent quantum dot patterns 231T, the blue light provided by blue light-emitting diode penetrates through the transparent quantum dot patterns 231T. Namely, the red quantum dot patterns 231R are excited and penetrated through by the blue light-emitting diode so that the red quantum dot patterns 231R produce red light and blue light simultaneously. The green quantum dot patterns 231G are excited and penetrated through by the blue light-emitting diode so that the green quantum dot patterns 231G produce green light and blue light simultaneously. The transparent quantum dot patterns 231T are transmitted through by the blue light-emitting diode so that the transparent quantum dot patterns 231T produce blue light.

Figure 3:
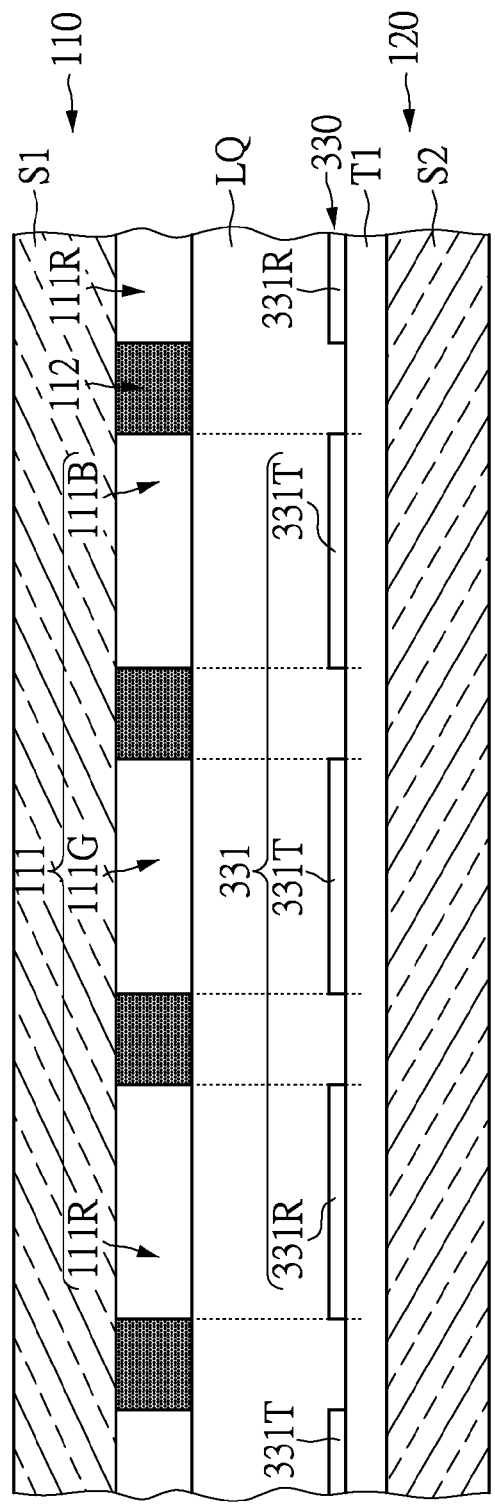
FIG. 3 illustrates a schematic structural view of a display device in accordance with the third embodiment of the instant disclosure.

FIG. 3 is a schematic structural view of a display device in accordance with the third embodiment of the instant disclosure. On the basis of above mentioned display device, there is provided another quantum dot pattern layer 330. Most of the implementation details refer to the foregoing description, and the common features are not described again.

In this embodiment, the display device 300 does not include the backlight module, and the quantum dot pattern layer 330 disposing between the first substrate S1 and the second substrate S2 can be used as a display medium layer. In this embodiment, the quantum dot pattern layer 330 is an electroluminescent quantum dot pattern layer so that the active element array layer T1 with a patterned electrode layer can control the brightness of the pixel of the quantum dot pattern layer 330 to change the grayscale value of pixel. The active element array layer T1 with a patterned electrode layer can be disposed on, but is not limited to, the second substrate S2. The quantum dot pattern layer 330 includes at least one quantum dot pattern 331 corresponding to one of the filter patterns 111, and the color of the quantum dot pattern 331 is identical to the color of the filter pattern 111. Specifically, the quantum dot pattern 331 includes the first quantum dot pattern and the second quantum dot pattern, and the color of the first quantum dot pattern is red, and the color of the second quantum dot pattern is transparent. Namely, the quantum dot pattern layer 330 consists of the configuration of the red quantum dot pattern 331R, and the transparent quantum dot pattern 331T.

Figure 4:
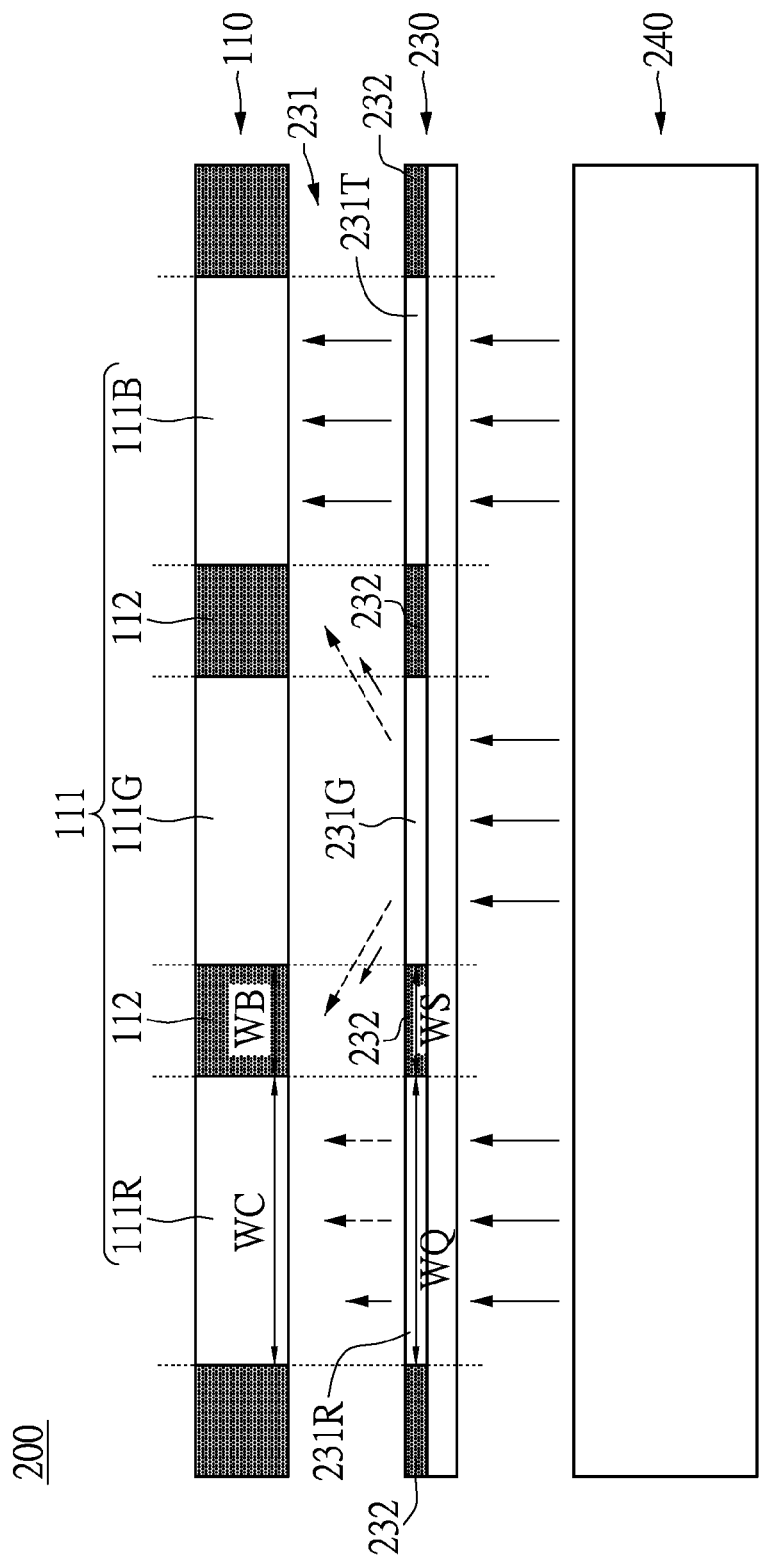
FIG. 4 a schematic structural view of a display device in accordance with the second embodiment of the instant disclosure.

In order to describe the relationship between the quantum dot pattern layer 230 and the color filter substrate 110, the display device 200 is described roughly in FIG. 4. FIG. 4 focuses on the simple structure of the quantum dot pattern layer 230 and the color filter substrate 110, and omits the display medium layer LQ, the active element array substrate 120, and other elements. Most of the implementation details refer to the foregoing description, and the common features are not described again.

FIG. 4 is a schematic structural view of a display device in accordance with the second embodiment of the instant disclosure. Specifically, while the blue light-emitting diode irradiates upon the red quantum dot patterns 231R, the green quantum dot patterns 231G, and the transparent quantum dot patterns 231T, the red quantum dot patterns 231R produce red light and blue light simultaneously. The green quantum dot patterns 231G are excited and penetrated through by the blue light-emitting diode so that the green quantum dot patterns 231G produce green light and blue light simultaneously. The transparent quantum dot patterns 231T are penetrated through by the blue light-emitting diode so that the transparent quantum dot patterns 231T produce blue light. However, color mixing between adjacent filter patterns 111 may occur because of the light leakage from adjacent quantum dot patterns 231 producing different color light.

For example, to the red quantum dot patterns 231R, the locations of the red quantum dot pattern 231R correspond to the locations of the red filter pattern 111R, and the locations of the green quantum dot pattern 231G are adjacent to the red quantum dot pattern 231R. Most of red light and blue light produced from the red quantum dot pattern 231R would penetrate through the red filter pattern 111R, and part of green light and blue light produced from the green quantum dot pattern 231G would leak to the red filter pattern 111R. Therefore, the red filter pattern 111R would receive the most red light and blue light produced from the red quantum dot pattern 231R and part of the green light and blue light produced from the green quantum dot pattern 231G.

Besides, in the blue filter patterns 111B, the locations of the transparent quantum dot pattern 231T correspond to the locations of the blue filter patterns 111B, and the locations of the green quantum dot pattern 231G are adjacent to the transparent quantum dot pattern 231T. Most of blue light produced from the transparent quantum dot pattern 231T would penetrate through the blue filter pattern 111B, and part of the green light and blue light produced from the green quantum dot pattern 231G would leak to the blue filter pattern 111B. Therefore, the blue filter pattern 111B would receive most of the blue light produced from the transparent quantum dot pattern 231T and part of the green light and blue light produced from the green quantum dot pattern 231G.

Figure 5A:
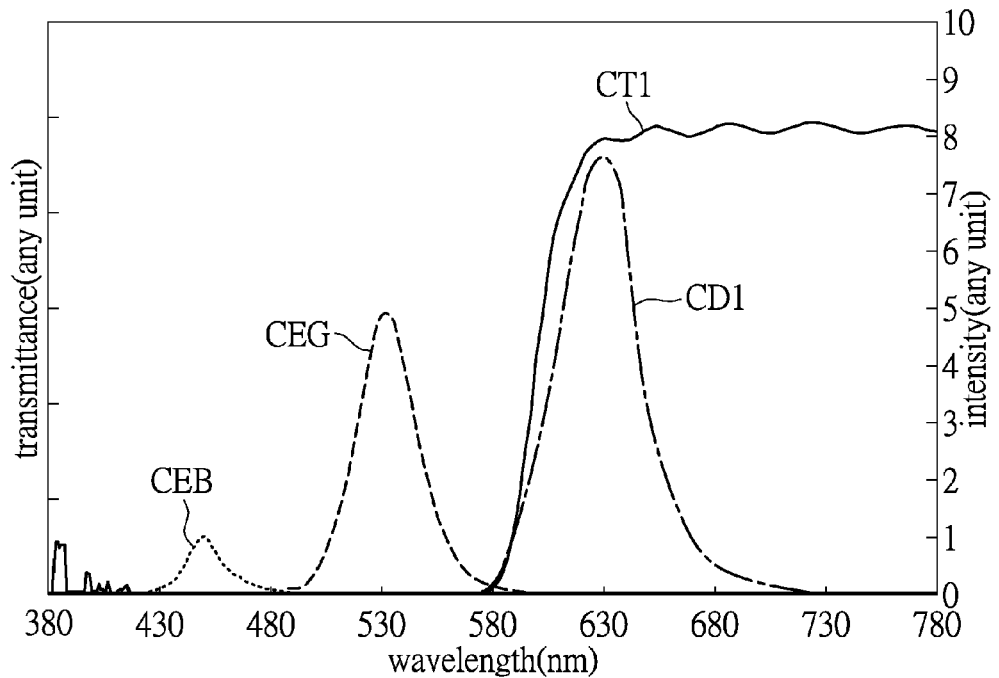
FIG. 5A is a diagram illustrating the transmission spectrum of red filter pattern overlaid with the emission spectrum of the green quantum dot pattern and the display spectrum of the total light transmittance through the red filter pattern.

In particular, the color mixing between adjacent filter patterns 111 produced by adjacent quantum dot patterns 231 would be realized through the superposition spectrum of each filter pattern 111. Please refer to FIG. 5A and with reference to FIG. 4. FIG. 5A is a diagram illustrating the transmission spectrum of the red filter pattern 111B (CT1) overlaid with the emission spectrum of the green quantum dot pattern 231G (CEG and CEB) and the display spectrum of the total light transmittance through the red filter pattern 111R (CD1). In FIG. 5A, x-axis represents the wavelength (unit: nm), y-axis (left) represents transmittance of transmission spectrum (any unit), and y-axis (right) represents the intensity of excitation spectrum (any unit).

Specifically, the red quantum dot pattern 231R is excited and penetrated by the blue light of the blue light-emitting diode to produce the red light and blue light, and then the red light and blue light penetrate through the red filter pattern 111R. Therefore, the red filter pattern 111R filter out the blue light and the red light filters through the red filter pattern 111R. The curve CT1 represents the transmittance curve of the red filter pattern 111R. While the user uses the display device 200, the light penetrating from each pixel is not only influenced by the quantum dot pattern layer 230 and the color filter substrate 110 but also the display medium layer LQ, the active element array substrate 120 and other elements of the display device 200. The curve CD1 represents the transmittance curve of one pixel of the display frame corresponding to the red filter pattern 111R. Therefore, the curve CD1 represents the transmittance of the total light transmittance through the red filter pattern 111R, and the sum of light includes the light provided by the red quantum dot patterns 131R and the light leakage from adjacent quantum dot patterns leak to the red filter pattern 111R. The green quantum dot patterns 231G are excited by the blue light-emitting diode to produce green light and slightly blue light, and the green light and slightly blue light in the emission spectrum are the curve CEG and the curve CEB respectively.

In FIG. 5A, the curves CT1, CD1, CEG and CEB illustrate the variation of each spectrum curve with different wavelength. There is an overlapping area between the curve CEG and the curve CT1, the overlapping area represents that the red filter pattern 111R receives part of the green light provided from the green quantum dot patterns 231G within the wavelength range of the red filter pattern 111R in the transmission spectrum. In order words, the part of the green light provided by the green dot quantum pattern 231G next to the red filter pattern 231R makes the red filter pattern 231R produce color mixing.

In addition, the red filter pattern 111R also receives the part of the blue light provided by the green quantum dot pattern 231G. Since there is almost no overlapping area between the wavelength range of blue light and the red filter pattern 111R in the transmission spectrum, the red filter pattern 111R does not comparatively produce color mixing by the blue light.

Figure 5B:
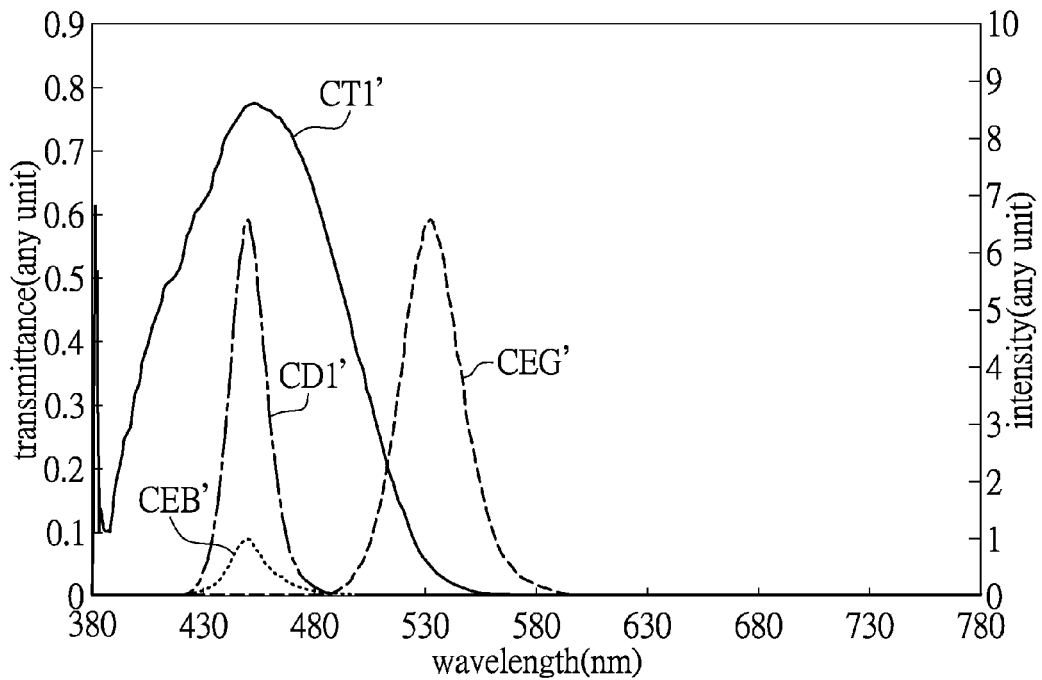
FIG. 5B is a diagram illustrating the transmission spectrum of blue filter pattern overlaid with the emission spectrum of the green quantum dot pattern and the display spectrum of the total light transmittance through the blue filter pattern.

FIG. 5B is a diagram illustrating the transmission spectrum of blue filter pattern 111B (CT1') overlaid with the emission spectrum of the green quantum dot pattern 231G (CEG' and CEB') and the display spectrum of the total light transmittance through the blue filter pattern 111B (CD1'). Please refer to FIG. 5B and with reference to FIG. 4. In FIG. 5B, x-axis represents the wavelength (unit: nm), y-axis (left) represents transmittance of transmission spectrum (any unit), and y-axis (right) represents the intensity of excitation spectrum (any unit).

To be specific, the transparent pattern 231T is penetrated by the blue light emitted from the blue light-emitting diode to produce a blue light, and then the blue light provided by the transparent pattern 231T penetrates through the corresponding blue filter pattern 111B, and so the corresponding blue filter pattern 111B transmits blue light. In order words, the curve CT1' represents the transmittance curve of the blue filter pattern 111B. Furthermore, the spectrum of one position that corresponds to the red filter pattern 111R in the display frame is only affected by the quantum dot pattern layer 230, the active element array substrate 120, the display medium layer LQ, the color filter substrate 110 and other elements of the display device 200. The curve CD1' represents the transmittance curve of one position that corresponds to the blue filter pattern 111B in the display frame. Therefore, the curve CD1' represents total light transmittance penetrating from the blue filter pattern 111B. Moreover, the green quantum dot patterns 231G are excited by the blue light-emitting diode to produce the green light and blue light, where the green light and the blue light emission spectra are the curve CEG' and the curve CEB' respectively.

In FIG. 5B, the curves CT1', CD1', CEG' and CEB' illustrate the variation of each spectrum curve with different wavelength. There is an overlapping area between the curve CEG' and the curve CT1', the overlapping area represents that the blue filter pattern 231B receives part of the green light provided from the green quantum dot patterns 231G within the wavelength range of the overlapping area. In order words, the part of the green light provided by the green quantum dot pattern 231G next to the transparent pattern 231T makes the blue filter pattern 231B produce color mixing.

In addition, the blue filter pattern 111B also receives blue light provided by the green quantum dot pattern 231G. Since the color and wavelength of blue light is approximately identical to the blue filter pattern 111B, the blue light will not make blue filter pattern 111B produce color mixing.

It is worth mentioning that the light that transits through one of the filter patterns 111 could be affected by light leakage from adjacent quantum dot patterns next to the quantum dot patterns 231 corresponding to the filter pattern 111. The color mixing can be improved by settling different light-shielding pattern structures (such as the first light-shielding pattern 112) or adjusting the width and the interval of the quantum dot patterns so as to lower the possibility of color shift. Besides, in the assembly process of the display device, the third substrate S3 aligns and attaches the substrate disposed filter pattern 111, and then is accompanied with the panel, driver chip, circuit board and backlight module to assemble a display device.

Please refer to FIG. 4, in order to decrease the chance of light leakage, which means to reduce the light provided from the green quantum dot pattern 231G leaking to the range of the filter pattern which is not corresponding to the green quantum dot pattern 231G, such as the red filter pattern 111R or the blue filter pattern 111B. If the light provided from the green quantum dot pattern 231G leaks to the red filter pattern 111R or the blue filter pattern 111B, the color of the red filter pattern 111R or the blue filter pattern 111B will be affected and then influence the purity of color. Therefore, deposing the light-shielding pattern structure can reduce light leakage. The position of first light-shielding pattern 112 of can be correspondingly deposed between two adjacent quantum dot patterns 231. In order words, the quantum dot pattern is located between the two first color filter patterns 112 which are adjacent to the first color filter pattern corresponding to the quantum dot pattern. In this way, the range of the first color filter pattern will not be in excess of the range of the first color filter pattern which is adjacent to the two first light-shielding patterns 112. The relation between the width of those first light-shielding patterns 112 of the color filter substrate 110 and the interval between the two adjacent quantum dot patterns 231 is as follows (1):

$$WB \leq WS \qquad (1)$$

WB represents the width of the first light-shielding pattern 112. WS represents the interval between the two adjacent quantum dot patterns. If the second light-shielding pattern 232 is deposed at the interval between the two adjacent quantum dot patterns, WS represent the width of the second light-shielding pattern 232.

In addition, the mathematical relation between the width of the first color filter pattern 111 and the width of the quantum dot pattern 231 is as follows (2):

$$WC \leq WQ \qquad (2)$$

WC represents the width of the first color filter pattern. WQ represents the width of the quantum dot pattern.

Based on the relations (1) and (2), the width of the first light-shielding pattern and the quantum dot patterns or interval between the first light-shielding pattern and the quantum dot patterns is designed to prevent the light provided by the quantum dot pattern 231 from leaking to the filter pattern 111 corresponding to adjacent quantum dot pattern. In the embodiment, the color filter layer is deposed on the first substrate. In another embodiment, the color filter layer can be deposed on the second substrate. In practice, the structure of the color filter substrate of the present invention can be processed using a different design, on the premise that the structure design of the color filter substrate conforms to those relations (1) and (2).

Figure 6A:
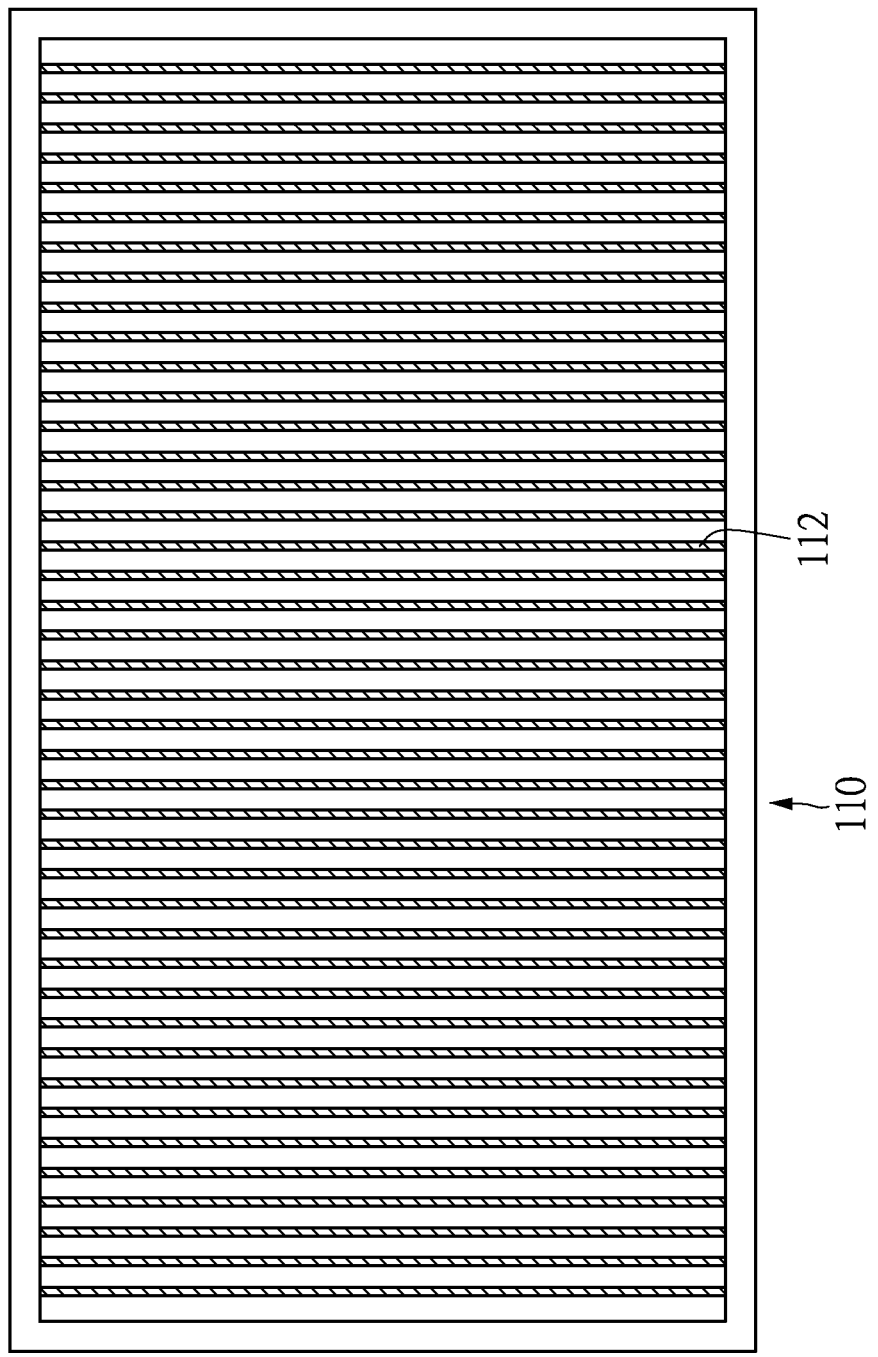
FIG. 6A illustrates a vertical view of the color filter substrate in accordance with one embodiment of the instant disclosure.

FIG. 6A illustrates a vertical view of the color filter substrate in accordance with one embodiment of the instant disclosure. Please refer to FIG. 6A. In order to lower the chance of light leakage, the color filter substrate 110 includes several first light-shielding patterns 112 with the same width, and the relation between the width of those first light-shielding 112 and the interval of the two adjacent quantum dot patterns 231 conforms to the mathematical relation above. The relation between the width of the first pattern 111 and the width of the quantum dot pattern 231 also conforms to the mathematical relation above. In this embodiment, the first light-shielding pattern 112 is disposed in vertical direction (as shown in FIG. 6A). In another embodiment, the first light-shielding pattern 112 can be a grid-like pattern or other pattern design accompanying with filter pattern.

Figure 6B:
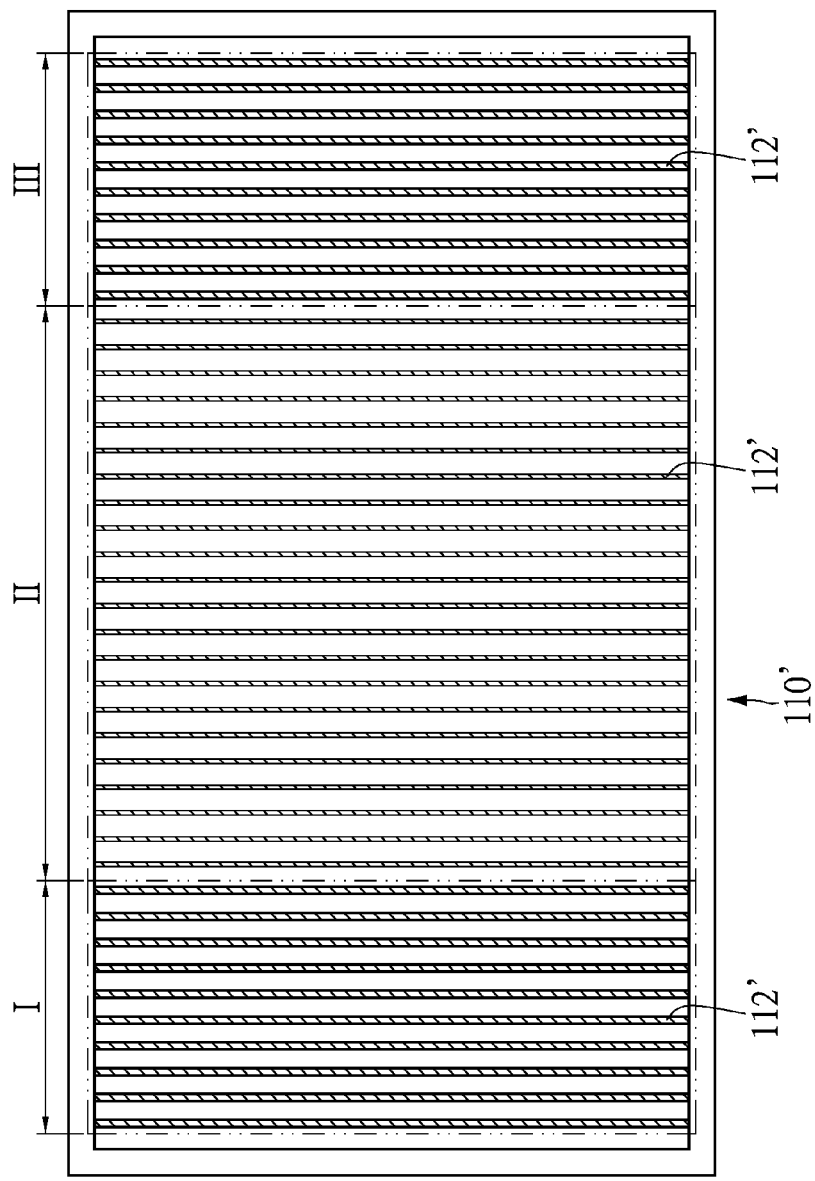
FIG. 6B illustrates a vertical view of the color filter substrate in accordance with other embodiment of the instant disclosure.

In addition, FIG. 6B illustrates a vertical view of the color filter substrate in accordance with another embodiment of the instant disclosure. Please refer to FIG. 6B. If the display device is a curved panel, the two sides and the middle of the display device have different curvature radius, so that it is easier to leak light at both sides of the display device. For example, when the curvature radius of both sides of the curved plate is smaller than the middle area of the curved panel which is larger, the width of the first light-shielding pattern 112 can be adjusted in different parts depending on demand. The color filter substrate 110', from one side stretches across the center to another side, and is divided into three areas in order: the first area I, the second area II and the third area III. The width of the first light-shielding pattern 112' located at the first area I and the width of the first light-shielding pattern 112' located at the second area III are both larger than the width of the first light-shielding pattern 112' located at the second area II. Similarly, the relation between the width of the first light-shielding 112' and the interval of the two adjacent quantum dot patterns conforms to the mathematical relation above. Accordingly, the width of the first light-shielding pattern 112' located at the first area I and the width of the first light-shielding pattern 112' located at the second area III are both wider, so as to decrease the chance of light leakage on both sides of the display device.

Figure 7A:
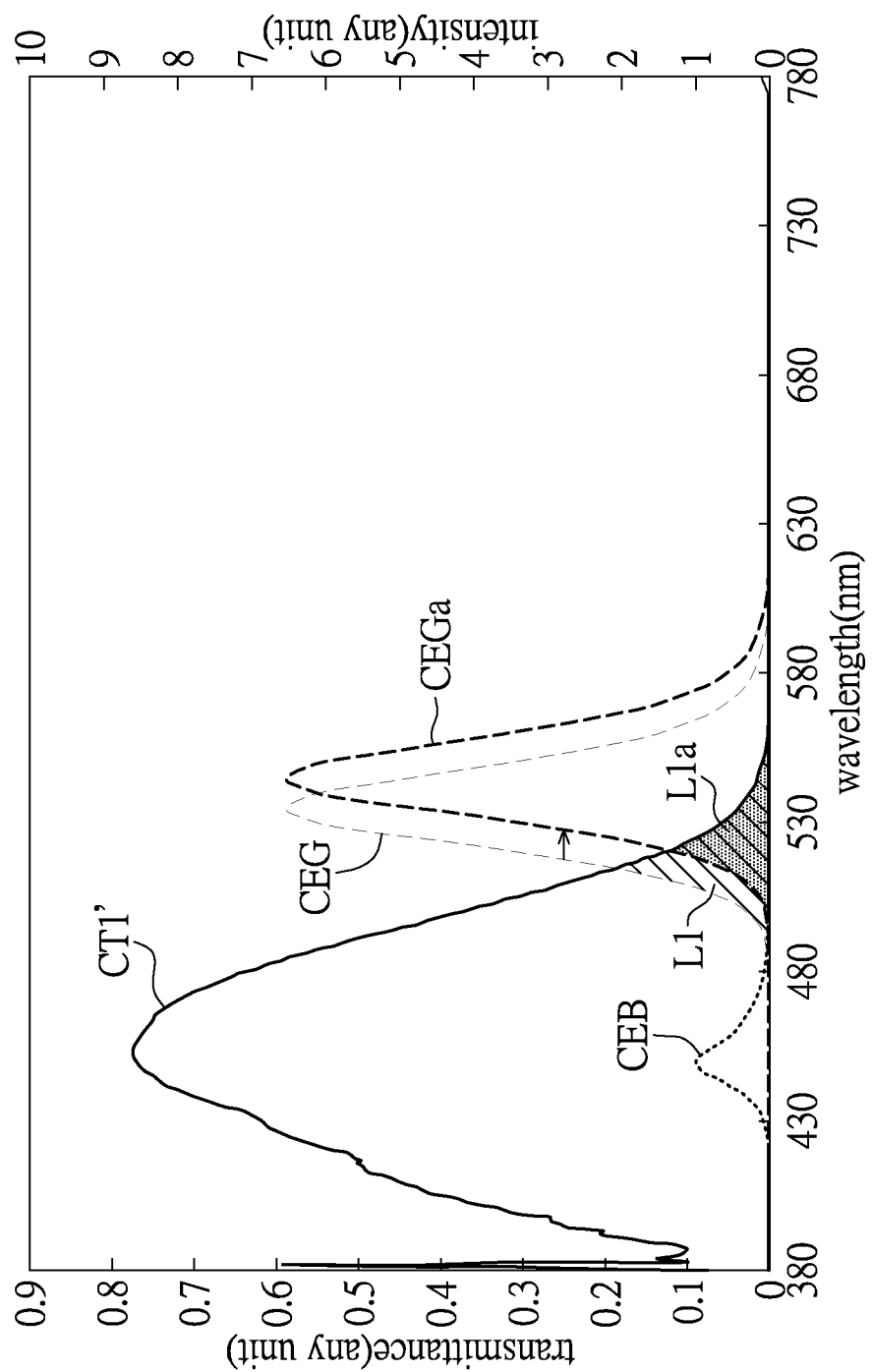
FIGS. 7A and 7B both are superposition spectrums formed by the transmission spectrum of blue filter pattern and the emission spectrum of the green quantum dot pattern.
Figure 7B:
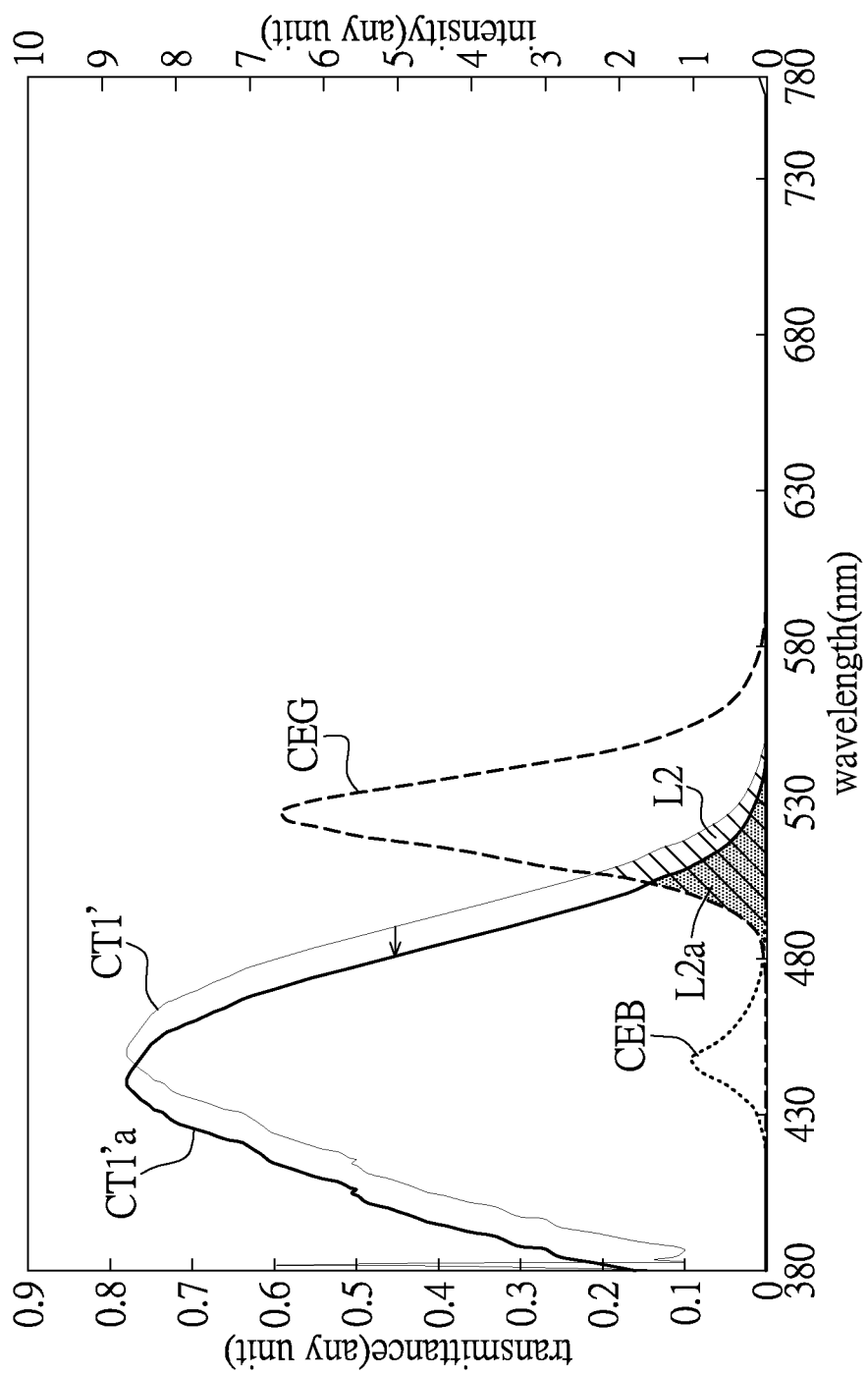

FIGS. 7A and 7B both are superposition spectrums formed by the transmission spectrum of the blue filter pattern and the emission spectrum of the green quantum dot pattern. Please refer to FIGS. 7A and 7B with reference to FIG. 4. In the blue filter pattern 111B, the magnitude of light leakage of the green quantum dot pattern 231G is inversely proportional to the distance between the main peak value of the emission spectrum of the green quantum dot pattern 231G (the main peak value of the curve CEG) and the main peak value of the transmission spectrum of the blue filter pattern 111B (the main peak value of the curve CT1'). In order to decrease the chance of light leakage, it is feasible to pull the main peak of the emission spectrum of the green quantum dot pattern 231G out of the main peak of the transmission spectrum of the blue filter pattern so as to allow the overlapping area between the curve CEG and the curve CT1' to be reduced. Therefore, the proportion of leakage light provided from the green quantum dot pattern leaking to the blue filter pattern 111B is smaller than about 10% of the total light within the wavelength range of the blue filter pattern 111B in the emission spectrum.

Please refer to FIG. 7A. Specifically, in order to reduce the overlapping area of the curve CEG and the curve CT1' and decrease the chance of light leakage, it is feasible to adjust the size or materials of the green quantum dot pattern 231G so as to make the main peak value of the spectrum of the green quantum dot pattern 231G redshift. In order words, the main peak value of the curve CEG on the spectrum of the green quantum dot pattern 231G removes away from the main peak value of the transmission spectrum of the blue filter pattern 111B and shifts toward the long wavelength. After redshifting, the curve CEGa represents the green quantum dot pattern 231G in emission spectrum, and the overlapping area L1a between the curve CEGa and the curve CT1' is relatively smaller than the overlapping area L1 between the curve CEG and the curve CT1' so as to decrease the proportions of light leakage on the overlapping area L1a smaller than 10%.

In addition, please refer to FIG. 7B, it is feasible to adjust the size or materials of the blue filter pattern 111B so as to make the main peak value of the transmission spectra of the blue filter pattern 111B blueshift. In order words, the main peak value of the curve CT1' on the transmission spectrum of the blue filter pattern 111B removes away from the main peak value of the spectrum of the green quantum dot pattern 231G and shifts toward the short wavelength. After blue-shifting, the curve CT1'a represents the green quantum dot pattern 231G in emission spectrum, and the overlapping area L2a between the curve CEG and the curve CT1'a is relatively smaller than the overlapping area (L2) between the curve CEG and the curve CT1' so as to decrease the proportions of light leakage on the overlapping area L2a to be smaller than 10%.

In FIG. 7B, in order to decrease the chance of light leakage make the proportion of leakage light provided from the green quantum dot pattern leaking to the blue filter pattern 111B smaller than about 10% of the sum of light within the wavelength range of the blue filter pattern 111B in the emission spectrum, which can also be described as following:

$$0 \le \frac{L2}{D1} \le 10\%$$

D1 represents the total light within the range of wavelength of the blue filter pattern 111B in the transmission spectra. And D1 includes three parts: the first part represents the magnitude of blue light provided from the blue backlight source to the area corresponding to the blue filter pattern 111B (not shown in the figure). But when the backlight source is ultraviolet, the magnitude of light should subtract the part of the unconverted light. The second part represents the magnitude of the remaining part of the blue backlight which transits through the green quantum dot pattern but is not converted or excited, which is the curve CEB (within the wavelength range of the blue filter pattern 111B in the emission spectrum.). The third part represents the green light leakage L2 which is the green light within the range of transmission spectra of the blue filter pattern provided from the green quantum dot pattern after being excited and converted by the blue backlight. The light leakage L2 only represents the green light area, which is excited and converted by the blue backlight and the overlaps the transmission spectra of the blue filter pattern 111B, except for the unconverted blue backlight. L2 is substantially the light leakage within the overlapping area between the curve CEG and the curve CT1'.

It is worth mentioning that the mathematical relation above is to use FIG. 7 accompanied with the blue filter pattern 111B as an example. However, the mathematical relation can apply to calculate the light leakage of filter patterns with different colors. In this embodiment, there is no limitation regarding to the color of the filter pattern. The ordinary person skilled in the art can adjust the color of the filter pattern 111 or the size or material of the quantum dot pattern 231 depending on the design of the display device and the spirit mentioned above. Most of the implementation details are referred to the foregoing description, and the common features are not described again.

In summary, the instant disclosure provides a display device including the quantum dot pattern layer deposed on the third substrate. The quantum dot pattern layer aligns with the color filter layer, and the color of the quantum dot pattern is identical to the corresponding filter pattern. In one embodiment, the quantum dot pattern layer consists of the configuration of the red quantum dot pattern and the transparent pattern. The location of the red quantum dot pattern corresponds to the location of the red filter pattern, and the locations of transparent pattern correspond to the locations of the green and blue filter pattern. In this embodiment, the backlight module can be accompanied with blue light emitting diode chips and green light emitting diode chips. In another embodiment, the quantum pattern layer consists of the configuration of the red quantum dot pattern, green quantum dot pattern and the transparent pattern. The locations of the red quantum dot pattern correspond to the locations of the red filter pattern, and the locations of the green quantum dot patterns correspond to the locations of the green filter patterns, and the locations of the transparent pattern correspond to the locations of the blue filter patterns. In this embodiment, the backlight module can be accompanied with blue light emitting diode chips. Since the peak of the excitation spectrum of the quantum dot pattern is narrow, it is feasible to excite the high purity light with different color through irradiating the backlight so as to raise the color saturation of the liquid crystal display device.

In addition, the instant disclosure can decrease the chance of leaking light through adjusting the width of the first light-shielding pattern. In another embodiment, the main peak value of the spectrum of the quantum dot pattern removes away from the main peak value of the transmission spectrum of the filter pattern and shifts toward the long wavelength by adjusting the size or materials of the quantum dot pattern or the filter pattern, so that the proportion of leakage light leaking to the adjacent filter pattern is smaller than about 10% of the total light to avoid affecting the purity of color.

The above-mentioned descriptions represent merely the exemplary embodiment of the instant disclosure, without any intention to limit the scope of the instant disclosure thereto. Various equivalent changes, alterations or modifications based on the claims of the instant disclosure are all consequently viewed as being embraced by the scope of the present disclosure.

What is claimed is:

1. A display device, comprising:
   a first substrate;
   a second substrate;
   a display medium layer located between the first substrate and the second substrate;
   a color filter layer located between the first substrate and the second substrate and includes a first color filter pattern, a second color filter pattern and a first light-shielding pattern located between the first color filter pattern and the second color filter pattern;
   a backlight module disposed at one side of the second substrate which is located between the backlight module and the display medium layer;
   a third substrate located between the backlight module and the second substrate; and
   a quantum dot pattern layer disposed on the third substrate and between the third substrate and the second substrate, wherein the quantum dot pattern layer includes at least one first quantum dot pattern corresponding to the first color filter pattern, and the color of the first quantum dot pattern is identical to the color of the first color filter pattern;
   wherein the quantum dot pattern layer further comprises a transparent quantum dot pattern or a vacant site corresponding to the second color filter pattern and a second light-shielding pattern located between the first quantum dot pattern and the transparent quantum dot pattern;
   wherein a part of an incident light generated from the backlight module excites the first quantum dot pattern to generate a light of the same color as the color of the first color filter pattern, and another part of the incident light generated from the backlight module penetrates the transparent quantum dot pattern or the vacant site without exciting the quantum dot pattern layer;
   wherein the width of the first light-shielding pattern is larger than the second light-shielding pattern.

2. The display device according to claim 1, wherein the display device further comprising a third color filter pattern and a third quantum dot pattern, and the third color filter pattern corresponds to the third quantum dot pattern, and the color of the third quantum dot pattern is identical to the color of the third color filter pattern.

3. The display device according to claim 2, wherein the first quantum dot pattern is adjacent to the third quantum dot pattern, wherein the width of the first light-shielding pattern is larger than the interval between the first quantum dot pattern and the third quantum dot pattern.

4. The display device according to claim 2, wherein the total light transiting the first color filter pattern and the light leakage of the third quantum dot pattern transiting to the first color filter pattern are corresponded to the mathematical relation described below:

$$0 \leq \frac{L2}{D1} \leq 10\%,$$

wherein D1 represents the total light within range of wavelength of the first color filter pattern in transmission spectrum; L2 represents light leakage excited from the third quantum dot pattern within range of wavelength of the first color filter pattern in transmission spectrum and subtracting the part of light not converted into the color of the first color filter pattern.

5. The display device according to claim 1, wherein the difference between a peak value of the first quantum dot pattern and a peak value of the first filter pattern in transmission spectra is equal to or less than 50 nanometers.

6. The display device according to claim 1, wherein the display device further including a polarizer located between the second substrate and the quantum dot pattern layer.

7. The display device according to claim 1, wherein the color filter layer is disposed on the second substrate.

8. The display device according to claim 1, wherein the backlight module includes a light source, and the light source is blue light source or ultraviolet light source.

9. The display device according to claim 1, wherein the third substrate is glass substrate or flexible substrate.

* * * * *